United States Patent
Pegg et al.

(10) Patent No.: US 6,660,320 B1
(45) Date of Patent: Dec. 9, 2003

(54) PROCESS FOR PRODUCING AN ANTIOXIDANT EXTRACT FROM THE BEARBERRY PLANT

(75) Inventors: Ronald Bruce Pegg, Saskatoon (CA); Branka Barl, Saskatoon (CA); Ryszard Amarowicz, Olsztyn (PL)

(73) Assignee: University of Saskatchewan Technologies Inc., Saskatoon (CA)

( * ) Notice: Subject to any disclaimer, the term of this patent is extended or adjusted under 35 U.S.C. 154(b) by 0 days.

(21) Appl. No.: 09/598,915

(22) Filed: Jun. 22, 2000

Related U.S. Application Data

(60) Provisional application No. 60/141,314, filed on Jun. 25, 1999.

(51) Int. Cl.$^7$ ................................................. A23L 1/00
(52) U.S. Cl. .................. 426/541; 426/542; 426/429
(58) Field of Search ................................ 426/541, 429, 426/542, 425, 430

(56) References Cited

U.S. PATENT DOCUMENTS

| | | | |
|---|---|---|---|
| 5,310,554 A | * | 5/1994 | Haigh ......................... 424/439 |
| 6,024,998 A | * | 2/2000 | Kreuter et al. ............... 426/330 |
| 6,207,164 B1 | * | 3/2001 | Kreuter et al. ............ 424/195.1 |

OTHER PUBLICATIONS

Amarowicz and Shahidi, Antioxidant activity of green tea catechins in a B–carotene–linoleate model system, J. Food Lipids 2, 1995, 47–56, Food & Nutrition Press, Inc., Trumbull, CT.

Amarowicz, Karamac, Wanasundara and Shahidi, Antioxidant activity of hydrophobic phenolic fractions of flaxseed, Nahrung 41, 1997, 178–180, Nr. 3, S., Weinheim.

Amarowicz, Troszynska, Karamac and Kozlowska, Antioxidative properties of legume seed extracts, Agri–Food Quality: an Interdisciplinary Approach, 1996, 376–379, The Royal Society of Chemistry, Cambridge, UK.

Amarowicz, Wanasundara, Karamac and Shahidi, Antioxidant activity of ethanolic extract of mustard seed, Nahrung 40, 1996, 261–263, Nr. 5, S., Weinheim.

Amarowicz, Karamac, Kmita–Glazewska, Troszynska and Kozlowska, Antioxidant activity of phenolic fractions of everlasting pea, faba bean and broad bean, J. Food Lipids 3, 1996, 199–211, Food & Nutrition Press, Inc., Trumbull, CT.

Amarowicz, Piskula, Honke, Rudnicka, Troszynska and Kozlowska, Extraction of phenolic compounds from lentil seeds (Lens culinaris) with various solvents, Pol. J. Food Nutr. Sci., 1995, 53–62, vol. 4/45 No. 3.

Amarowicz, Wanasundara, U., Wanasundara, J. and Shahidi, Antioxidant activity of ethanolic extracts of flaxseed in a B–carotene–linoleate model system, J. Food Lipids I, 1993, 111–117, Food & Nutrition Press, Inc., Trumbull, CT.

Amarowicz, Kozlowska, Shimoyamada and Okubo, Chromatographic analysis of rapeseed glucoside fractions, Pol. J. Food Nutr. Sci., Mar. 1992, 89–93, vol. 1/42 No. 1.

Barl, Loewen and Svendsen, Saskatchewan Herb Database, Jan. 1996, 18–23, University of Saskatchewan, Saskatoon, SK.

Barton, Evans and Gardner, Paper chromatography of phenolic substances, Nature, Aug. 9, 1952, 249–250, vol. 170.

Bedinghaus and Ockerman, Antioxidative maillard reaction products from reducing sugars and free amino acids in cooked ground pork patties, J. Food Sci., 1995, 992–995, vol. 60 No. 5.

Chavan, Amarowicz and Shahidi, Antioxidant activity of phenolic fractions of beach pea (*Lathyrus maritimus* L.), J. Food Lipids 6, 1999, 1–11, Food & Nutrition Press, Inc., Trumbull, CT.

Chen, Shi and Ho, Effects of rosemary extracts and major constituents on lipid oxidation and soybean lipoxygenase activity, J. Am. Oil Chem. Soc., Oct. 1992, 999–1002, vol. 69 No. 10.

Dziezak (ed.), Preservatives: Antioxidants, The ultimate answer to oxidation, Food Technol., Sep. 1986, 94–97, 100–102, vol. 40(9).

Hatano, Kagawa, Yasuhara and Okuda, Two new flavonoids and other constituents in licorice root: Their relative astringency and radical scavenging effects, Chem. Pharm. Bull., 1988, 2090–2097, vol. 36(6).

Miller, A simplified method for the evaluation of antioxidants, J. Amer. Oil Chem. Sci., 1971, 91, vol. 48.

Naczk and Shahidi, The effect of methanol–ammonia–water treatment on the content of phenolic acids of canola, Food Chem. 31, 1989, 159–164, Elsevier Science Publishers Ltd., England.

Naczk, Wanasundara and Shahidi, Facile spectrophotometric quantification method of sinapic acid in hexane–extracted and methanol–ammonia–water–treated mustard and rapeseed meals, J. Agric. Food Chem., 1992, 444–448, vol. 40 No. 3.

Nakatani, Antioxidants from spices and herbs, Natural Antioxidants, Chemistry, Health Effects, and Applications, 1997, 64–75, AOCS Press, Champaign, IL.

Namiki, Antioxidants/antimutagens in food, Crit. Rev. Food Sci. Nutr., 1990, 273–300, vol. 29 Issue 4.

(List continued on next page.)

Primary Examiner—Leslie Wong
(74) Attorney, Agent, or Firm—Miller Thomson LLP

(57) ABSTRACT

An antioxidant extracted from the bearberry plant (*Arctostaphylos uva-ursi*), particularly for use as a food preservative, and a process of extracting it from the bearberry plant are disclosed. The process includes grinding the leaves of the bearberry, mixing the ground leaves with ethanol, shaking the resulting slurry, filtering the slurry, evaporating the supernatant to dryness and dechlorophyllyzing the resulting precipitate using a silicic acid column with hexane as the mobile phase and recovering the dechlorophyllyzed extract using ethanol as the mobile phase.

8 Claims, 5 Drawing Sheets

OTHER PUBLICATIONS

Oyaizu, Studies on products of browning reaction: Antioxidative activities of products of browning reaction prepared from glucosamine, Jpn. J. Nutr., 1986, 307–315, vol. 44 No. 6.

Price, Van Scoyoc and Butler, A critical evaluation of the vanillin reaction as an assay for tannin in sorghum grain, J. Agric. Food Chem., 1978, 1214–1218, vol. 26 No. 5.

Shahidi, Wanasundara and Amarowicz, Natural antioxidants from low–pungency mustard flour, Food Res. Int., 1994, 489–493, vol. 27.

Swain and Hillis, The phenolic constituents of *Prunus domestica*. I.—The quantitative analysis of phenolic constituents, J. Sci. Food Agric., Jan. 1959, 63–68, vol. 10.

Wanasundara, Amarowicz and Shahidi, Partial characterization of natural antioxidants in canola meal, Food Res. Int., 1996, 525–530, vol. 28 No. 6, Elsevier Science Ltd., Great Britain.

Wanasundara, Amarowicz and Shahidi, Isolation and indentification of an antioxidative component in canola meal, J. Agric. Food Chem., 1994, 1285–1290, vol. 42.

Witte, Krause and Bailey, A new extraction method for determining 2–thiobarbituric acid values of pork and beef during storage, J. Food Sci., 1970, 582–585, vol. 35.

Wong, Hashimoto and Shibamoto, Antioxidant activities of rosemary and sage extracts and vitamin E in a model meat system, J. Agric. Food Chem., 1995, 2707–2712, vol. 43.

Yen and Chen, Antioxidant activity of various tea extracts in relation to their antimutagenicity, J. Agric. Food Chem., 1995, 27–32, vol. 43.

Zegarska, Rafalowski, Amarowicz, Karamac and Shahidi, Stabilization of butter with deodorized rosemary extract, Z. Lebensm Unters Forsch A, 1998, 99–102, vol. 206, Springer–Verlag.

* cited by examiner

PROCESS FOR PRODUCING AN ANTIOXIDANT EXTRACT FROM THE BEARBERRY PLANT

This application claims the benefit of U.S. Provisional Application No. 60/141,314, filed Jun. 25, 1999.

FIELD OF THE INVENTION

This invention relates to the use of plant extracts as antioxidants and natural food preservatives, and in particular relates to extracts from the bearberry plant and processes for producing such extracts.

BACKGROUND OF THE INVENTION

Lipid oxidation in food leads to flavor deterioration, formation of possible toxic products, discoloration of pigments, and loss of nutritional value arising from the destruction of fat-soluble vitamins and essential fatty acids (Nakatani, 1997). The lipids of cooked meats are particularly susceptible to oxidative degradation (e.g. autoxidation). These reactions are generally catalyzed by factors such as singlet oxygen, UV light, heat, meat ions and pigments. Furthermore, the rate at which autoxidation occurs, appears to depend on the degree of lipid unsaturation.

Antioxidants are substances that when present in foods or in the body at low concentrations compared with that of an oxidizable substrate markedly delay or prevent the oxidation of that substrate. Their addition to food prior to thermal processing acts to preserve the quality of the product by retarding autoxidation and rancidity development, as well as discoloration and loss of nutrients. The inhibitory effect of antioxidants has been attributed to preventing first-chain initiation by the donation of a hydrogen atom or an electron, binding metal ion catalysts, decomposing primary oxidation products to non-radical compounds, chain-breaking to prevent continued hydrogen abstraction from substrates, as well as the possible formation of a complex between the antioxidant and the lipid molecule (Dziezak, 1986). The most commonly used food-grade synthetic antioxidants are butylated hydroxyanisole (BHA), butylated hydroxytoluene (BHT), propyl gallate (PG) and tert-butylhydroquinone (TBHQ).

There has been a growing desire to replace traditional synthetic antioxidants in food systems with ones from natural sources due to the suspected carcinogenicity of BHA and BHT (Namiki, 1990; Chen et al., 1992). In particular, research efforts have been focused on the development and utilization of antioxidants from edible plant species. Examples of spices and herbs that have been examined for their antioxidant efficacy in foods include rosemary, sage, oregano, thyme, clove, ginger and marjoram (Wong et al., 1995). In most cases, the active compounds identified in the spices and herbs, or extracts therefrom, have been phenolic acids, flavonoids and/or tannins. One problem with some antioxidant preparations extracted from edible plants is that they may impart a flavor to the food to which they are applied. In some instances, this is a desirable attribute, but more often than not, it isn't. Kalsec's DURALOX (™) and Guardian's ROSEMARY EXTRACT (™) are commercially-available food preservatives (in powder and liquid form) containing plant-derived antioxidants.

Synthetic and natural source antioxidants are used to help preserve the quality of a variety of foods. Antioxidants are typically added to foods when they can be easily mixed in with the product. For example in meat products, sodium nitrite is a key additive for curing because it acts as a potent antioxidant. It is either added directly to meat batters during blending or is introduced by injection as a brine pickle into whole muscle products. Natural antioxidants found in spices and herbs are also added to a variety of meat formulations such as uncured sausages (either fresh or cooked) and salamis during blending or into hams by injection as a pickle.

Some traditional synthetic antioxidants, such as BHT, and many natural source antioxidants are not suitable for use in foods that are thermal processed. This is because the antioxidants are heat labile, in that their antioxidative efficacy is degraded or completely destroyed by normal cooking temperatures.

What is needed is a natural source antioxidant that does not impart a flavor to the food to which it is mixed, and which is not heat labile.

BRIEF SUMMARY OF THE INVENTION

According to one aspect, the invention consists of a process for producing a plant extract for use as an antioxidant, particularly as a food preservative, comprising the steps of:

extracting an intermediate extract from plant tissue obtained from the bearberry plant (*Arctostaphylos uva-ursi*) with a solvent containing ethanol;

loading the intermediate extract on a chromatographic column; and eluting chlorophyll from the column with a mobile phase comprising hexane.

The step of extracting the intermediate extract may comprise the steps of:

grinding the plant tissue;

mixing the ground plant tissue with the solvent to form a slurry;

filtering the slurry and collecting the supernatant; and evaporating the ethanol from the supernatant.

The steps of extracting the intermediate extract may also comprise the steps of:

heating the slurry; and shaking the slurry.

The column may comprise silicic acid.

The process for producing the plant extract may also comprise the step of eluting an ethanol fraction from the column with a mobile phase comprising ethanol.

The process for producing the plant extract may also comprise the step of evaporating the ethanol from the ethanol fraction. The step of evaporating the ethanol from the ethanol fraction may comprise the step of heating the ethanol fraction. The step of evaporating the ethanol from the ethanol fraction may comprise the step of subjecting the ethanol fraction to a pressure which is less than the ambient atmospheric pressure. The step of evaporating the ethanol from the ethanol fraction may comprise the steps of concurrently subjecting the ethanol fraction to a pressure which is less than the ambient atmospheric pressure and heating the ethanol fraction.

According to another aspect, the invention consists of a food preservative comprising an extract from the bearberry plant.

According to another aspect, the invention consists of a food containing a preservative, the preservative comprising an extract from the bearberry plant. The food may comprise a muscle food. The food may comprise pork.

BRIEF DESCRIPTION OF THE DRAWINGS

Embodiments of the invention will now be described with reference to the accompanying figures.

DESCRIPTION OF A SPECIFIC EMBODIMENT

1. Preparation of Bearberry Extract

Figure 1:
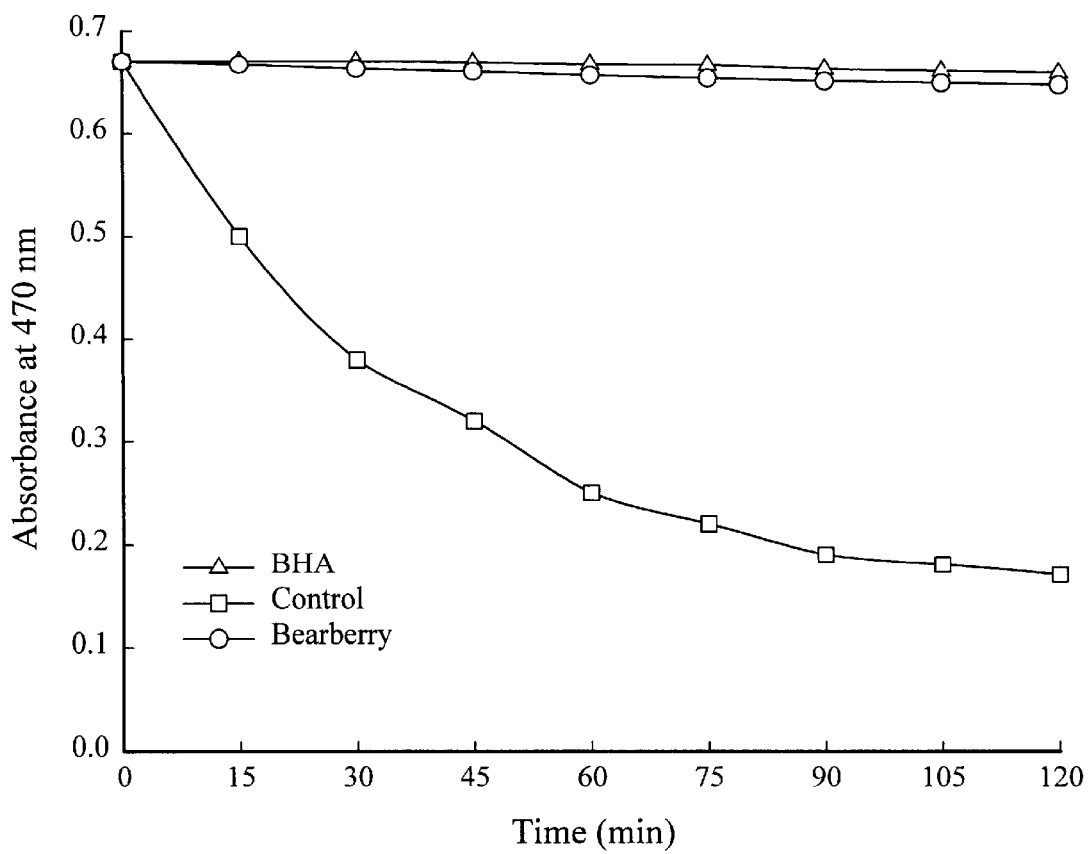
FIG. 1 is a graph illustrating the antioxidative effectiveness of the bearberry extract produced in accordance with the method of the present invention, as evaluated using a β-carotene-linoleate model system.

The bearberry (*Arctostaphylos uva-ursi*) leaves were ground using a Moulinex coffee mill. Prepared material was transferred to dark-colored flasks, mixed with 95% (v/v) ethanol at a material-to-solvent ratio of 15:100 (m/v) and placed in a shaking Magni Whirl constant temperature bath (Blue M Electric Company, Model MSG-1122A-1, Blue Island, Ill.) at 50° C. for 30 minutes. The extraction was repeated two more times and supernatants were combined. The resultant ethanolic extracts were evaporated to dryness under vacuum at 40° C. using a Buïchi Rotavapor/Water bath (Models EL 131 and 461, respectively, Brinkmann Instruments [Canada] Ltd., Toronto, ON). Due to the significant level of chlorophyll, samples were dechlorophyllized using a silicic acid column with hexane as the mobile phase. Prepared extracts were stored at 4° C. until further analyzed.

The bearberry extract is extracted from the leaves of the bearberry plant (*Arctostaphylos uva-ursi*). After the bearberry plant is harvested, the leaves are usually dried at 35° C. for a day or two. If the leaves are dried they can be stored for some period before being used, as drying delays the rotting of the leaves. However, it is not necessary to dry the leaves before the bearberry extract is prepared.

The antioxidative effect of the bearberry extract may be degraded by exposure to light, particularly ultraviolet light. It is preferable to protect the bearberry extract, and the various intermediate products in its extraction, from exposure to light, such as by using opaque containers.

An intermediate form of the bearberry extract is extracted from the bearberry leaves with a solvent containing ethanol; preferably, 95% (v/v) ethanol. A material-to-solvent ratio of 15:100 (m/v) is used. The preparation of the intermediate form of the bearberry extract can be facilitated by grinding the dried leaves before they are mixed with the ethanol, heating the leaf/ethanol slurry, and shaking the leaf/ethanol slurry. Grinding the leaves so that over 80% of the leaf particles are less than 1 mm facilitates the extraction. Heating the leaf/ethanol slurry to 50° C. facilitates the extraction. Shaking the leaf/ethanol slurry at 140 cycles per minute facilitates the extraction.

The leaf particles are separated from the ethanol/extract mixture by passing the leaf/ethanol slurry through a filter. An 11 micron particle retention filter is preferable for filtering the leaf/ethanol slurry. Filters of up to 25 micron particle retention are also suitable for filtering the leaf/ethanol slurry.

Additional amounts of the intermediate form of the bearberry extract can be prepared by repeating the ethanol extraction and filtration, with the filter residue. Repeating the ethanol extraction and filtration a total of three times, once with the original leaves and twice more with the filter residue, is preferable.

The resulting supernatant (or supernatants, if the ethanol extraction and filtration have been repeated with the filter residue) is evaporated to dryness. Evaporation is facilitated if the supernatant is under vacuum, that is, if the supernatant is subjected to a pressure which is less than the ambient atmospheric pressure. Heating the supernatant also facilitates evaporation of the ethanol. The supernatant can be heated to at least 85° C. without degrading the antioxidative effect of the bearberry extract. Applying a vacuum to the supernatant and gentle heating of the supernatant are most effective if the vacuum is sufficient to reduce the boiling point of the ethanol to the temperature to which the supernatant is heated, whereby the ethanol will rapidly boil away leaving a precipitate.

Column chromatography is used to remove chlorophyll from the precipitate. A silicic acid column is preferable. Chlorophyll may be eluted with hexane as the mobile phase. The dechlorophyllyzed bearberry extract is recovered through its elution from the column with ethanol as the mobile phase. The term "elute" and variations are used to refer to the use of a solvent to selectively separate substances from a column of adsorbent in chromatography. Hexane and ethanol are food-grade solvents.

The silicic acid column is prepared following standard well-known procedures. Commercially available silicic acid of mesh size of 200–400 microns is preferable. Silicic acid of mesh size of up to 1000 microns is also suitable. A sufficient quantity of silicic acid to fill the column vessel is mixed with 95% (v/v) ethanol, degassed using an ultrasonic bath and poured into the column vessel. Ethanol in an amount equal to two to three times the volume of the silicic acid column is washed/eluted through the silicic acid column by gravity to flush away any fines and to activate the silicic acid. Then, hexane in an amount equal to two to three times the volume of the silicic acid column is eluted through the silicic acid column by gravity.

The precipitate is mixed with ethanol, preferably in a rough ratio of 3 to 4 grams of precipitate to 20 to 30 milliliters of ethanol. This mixture is loaded into the column vessel atop the silicic acid column bed. Hexane is added to the top of the silicic acid column as the mobile phase to elute chlorophyll from the silicic acid column by gravity. Preferably, an amount of hexane roughly equal to one to two volumes of the silicic acid column is used. Then, an amount of ethanol equal to roughly two times the volume of the silicic acid column is washed through the silicic acid column by gravity so as to flush out the hexane.

An additional amount of ethanol equal to roughly one to two times the volume of the silicic acid column is passed through the silicic acid column by gravity so as to elute the desired material (i.e., to recover the product). This ethanol fraction is collected and evaporated to dryness. Evaporation is facilitated if the ethanol fraction is under vacuum, that is, the ethanol fraction is subjected to a pressure which is less than the ambient atmospheric pressure. Heating the ethanol fraction also facilitates evaporation of the solvent. The ethanol fraction can be heated to at least 85° C. without degrading the antioxidative effect of the bearberry extract. Applying a vacuum to the ethanol fraction and heating the ethanol fraction are most effective if the vacuum is sufficient to reduce the boiling point of the ethanol to the temperature to which the ethanol fraction is heated, whereby the ethanol will rapidly boil away.

The dried ethanol fraction is the bearberry extract. Each kilogram of dried bearberry leaves typically yields 210 grams of bearberry extract.

2. Testing the Bearberry Extract

(a) Introduction

The bearberry extract is an effective, natural-source antioxidant and food preservative. The bearberry extract was evaluated for its antioxidativeactivity using a β-carotene-linoleate model system, a reducing power assay, and scavenging effect on DPPH radical. Phenolic compounds proved to be, at least in part, responsible for the presence of the antioxidative activity of the bearberry extract. The multi-step fractionation of the bearberry extract by column chromatography yielded seven fractions, some of which exhibited an antioxidative efficacy equivalent to that of BHA, one of the commonly used food-grade synthetic antioxidants. The efficacy of the bearberry extract was tested in a meat model system. Again, bearberry showed a pronounced effect at inhibiting lipid oxidation, albeit its effect was concentration dependent.

(b) β-Carotene-Linoleate Model

The antioxidant activity of the bearberry extract was evaluated using a β-carotene-linoleate model system (Miller, 1971). Briefly, 2-mg quantities of β-carotene were dissolved in 10 mL of chloroform. One millilitre of this solution was then pipetted into a small round-bottom flask. After removing the chloroform using a rotary evaporator, 20 mg of purified linoleic acid, 200 mg of Tween 40 emulsifier and 50 mL of aerated, distilled water were added to the flask with vigorous stirring. Aliquots (5 mL) of prepared emulsion were transferred to a series of tubes containing 2 mg of extract or 0.5 mg of BHA. As soon as the emulsion was added to each tube, the zero time absorbance was read at 470 nm (nanometers) against a reagent blank using a spectrophotometer. Subsequent absorbance readings were recorded at 15-minute intervals by keeping the samples in water bath at 50° C. until the color of β-carotene disappeared.

As shown in FIG. 1, the greatest antioxidative efficacy was obtained for the BHA control, which completely inhibited β-carotene consumption throughout the incubation. However, the relative inhibitions of β-carotene consumption after 60 minutes of incubation by the bearberry extract was 98%. After a further 60 minutes of incubation, the inhibition of 0-carotene consumption for the bearberry extract was 96%. Although it is believed that the total number of hydroxyl groups present in the aromatic constituents of an extract, in part, offers better antioxidative properties to it, compounds present in ethanolic extracts, as with the bearberry extract, belong to different classes of phenolics. These classes might possibly have varying antioxidative strengths (Shahidi et al., 1994). In the case of the bearberry extract, its antioxidative activity in the β-carotene-linoleate model system was stronger than that observed for extracts from other known natural plant sources of antioxidants (Amarowicz et al., 1993; 1995; 1996a,b,c; 1997; Wanasundara et al., 1994; 1996; Amarowicz and Shahidi, 1995; Zegarska et al., 1998; Chavan et al., 1999).

(c) Thin Layer Chromatography (TLC)

Chromatograms of the bearberry extract by TLC were visualized for phenolic compounds. The bearberry extract was loaded on to TLC plates (Silica gel, average pore diameter, 60 Å; particle size, 2 to 25 μm; plate thickness, 200 μm, Sigma). Plates were developed in a glass chamber 29×2×27 cm (Fisher) using chloroform/methanol/water (65:35:10, v/v/v) as the mobile phase (Amarowicz et al., 1992). After drying, bands were located by viewing them under short (254 nm) and long (365 nm) UV light (Spectraline, Model ENF-240C, Spectronics Co., Westbury, N.Y., USA). Chemical classes of compounds were tentativelyidentified using spray systems: (a) ferric chloride-potassium ferricyanide-equal volumes of 1% (w/v) aqueous solutions of each salt were freshly mixed producing an orange-brown colored solution (phenols react immediately to give a blue color with this reagent, Barton et al., 1952); and (b) β-carotene-linoleate - the system was prepared as described above and applied according to Amarowicz et al. (1993). The chromatograms of the bearberry extract suggest that antioxidative activity can be attributed, at least in part, to phenolic compounds. The characteristics of the TLC plate sprayed with the ferric chloride-potassium ferricyanide solution showed 6 spots/bands which were phenolic in nature; $R_f$ values were determined at 0, 0.12, 0.18, 0.29, 0.47 and 0.52. When the matching developed TLC plate was sprayed with β-carotene-linoleate emulsion and then exposed to sunlight for a period, only the bands at 0, 0.47, and 0.52 exhibited antioxidant activity as evident by their ability to quench β-carotene bleaching.

The content of total phenolic compounds in the bearberry extract was determined according to Swain and Hillis (1959) as modified by Naczk and Shahidi (1989). Absorbance measurements were made using a UV-vis spectrophotometer. Instead of 3,5-dimethoxy-4-hydroxycinnamic acid (trans-sinapinic acid) as a standard, (+)-catechin was used. Total phenolic content of bearberry extract, expressed as (+)-catechin equivalents, was found to be 312 mg/g. Calculated as a percent of the dried bearberry leaves, the phenolic content of bearberry was 8.43%.

(d) Reducing Power and DPPH Scavenging

The reducing power of the bearberry extract was determined (Oyaizu, 1986 and Yen et al., 1995). Briefly, the extract (10 μg to 1000 μg) in 1 mL of distilled water was mixed with phosphate buffer (2.5 mL, 0.2 M, pH 6.6) and potassium ferricyanide $[K_3Fe(CN)_6]$ (2.5 mL, 1%). The mixture was incubated at 50° C. for 20 minutes. An aliquot (2.5 mL) of trichloroacetic acid (10% w/v) was added to the mixture, which was then centrifuged at 3000 rpm for 10 minutes. The upper layer of solution (2.5 mL) was mixed with distilled water (2.5 mL) and $FeCl_3$ (0.5 mL, 0.1%), and the absorbance was measured at 700 nm. Increased absorbance of the reaction mixture indicated increased reducing power.

The scavenging effect of extracts on DPPH radical was estimated (Hatano et al., 1988). Extracts (40 μg to 2000 μg) in 4 mL of distilled water were added to a methanolic solution of DPPH (1 mM, 1 mL). The mixture was shaken and left to stand at room temperature for 30 minutes before the absorbance of the resulting solution was measured spectrophotometrically at 517 nm.

Figure 2:
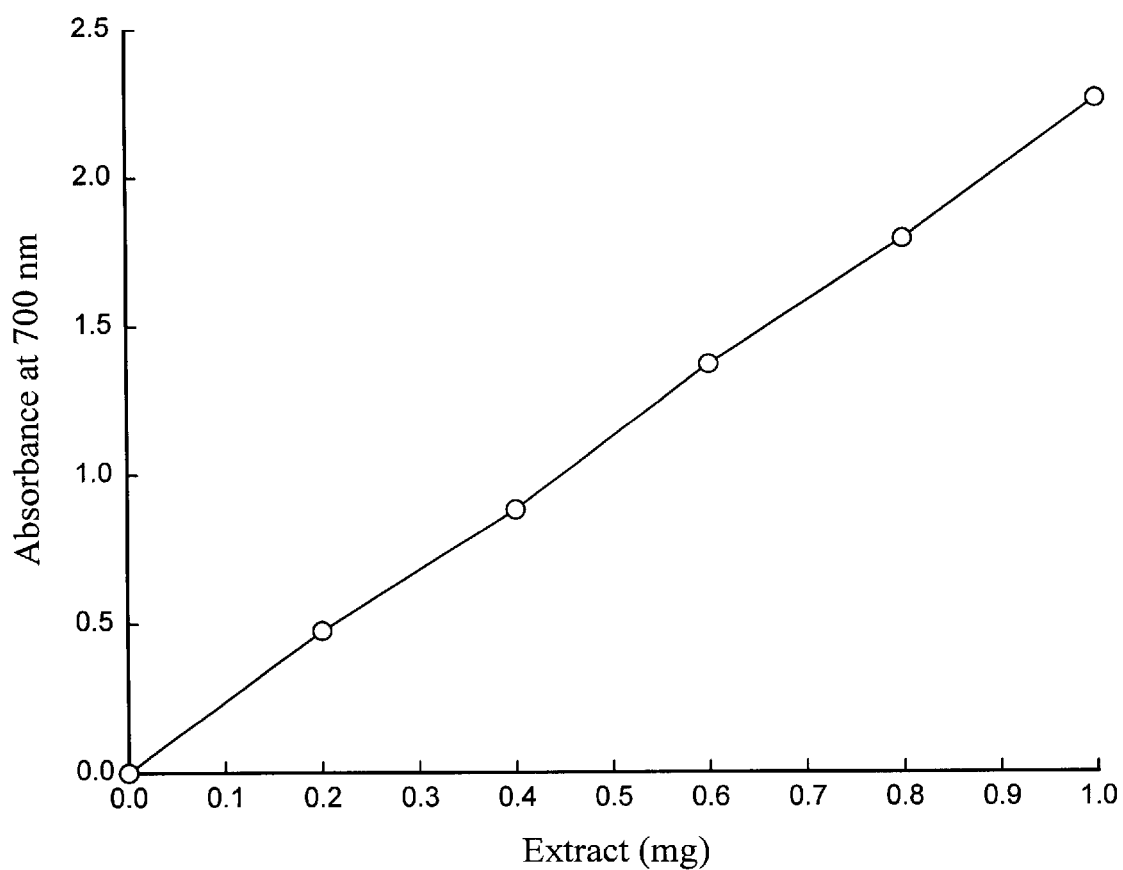
FIG. 2 is a graph illustrating the reducing power of the bearberry extract.
Figure 3:
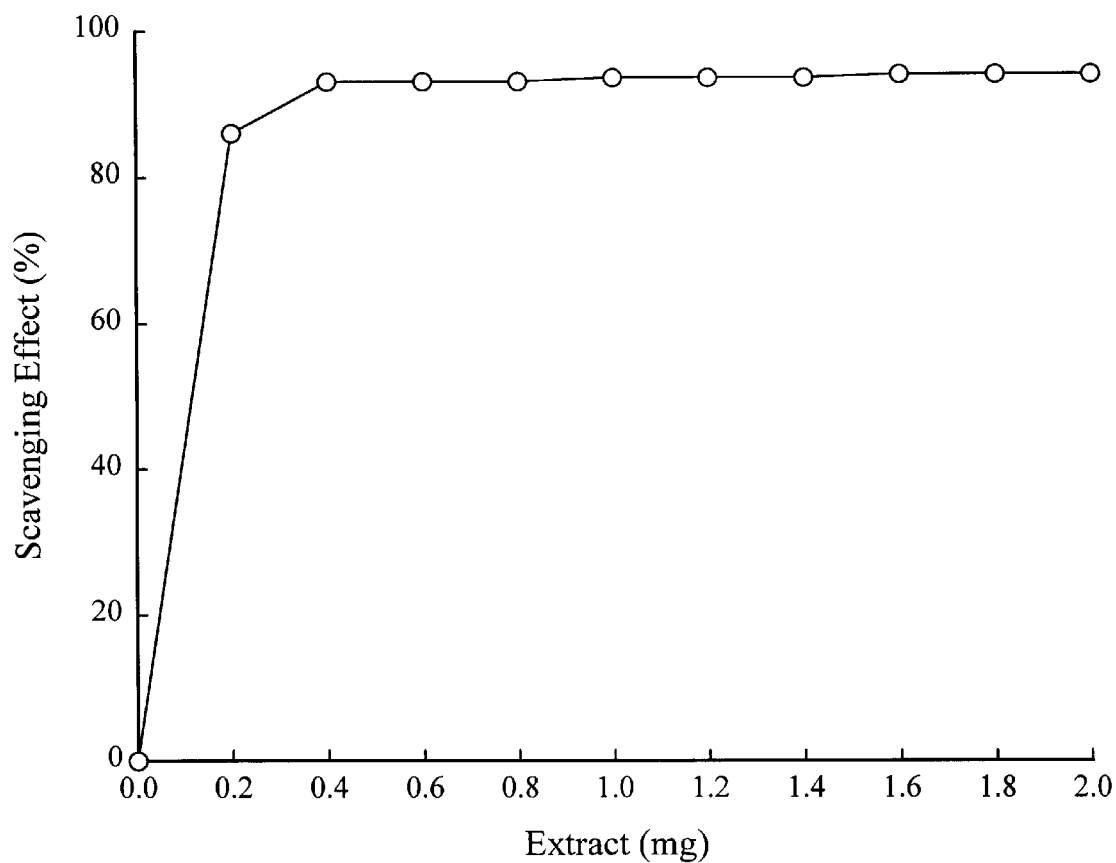
FIG. 3 is a graph illustrating the DPPH-scavenging effectiveness of the bearberry extract.

The bearberry extract possessed a marked reducing power and scavenging effect of the DPPH radical (FIGS. 2 and 3 respectively).

(e) Phenolic Fractionation

Figure 4:
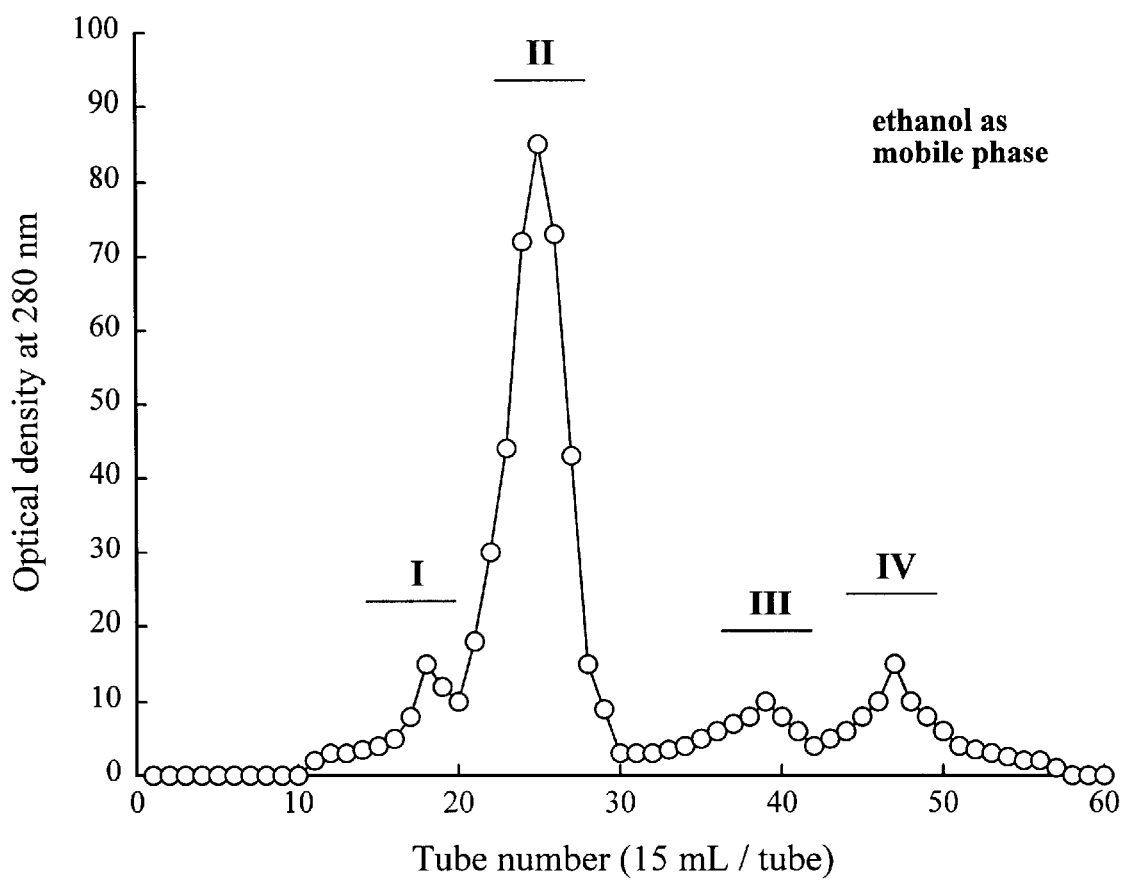
FIG. 4 is a graph illustrating the results for fractionation of the bearberry extract by column chromatography using ethanol as the mobile phase.
Figure 5:
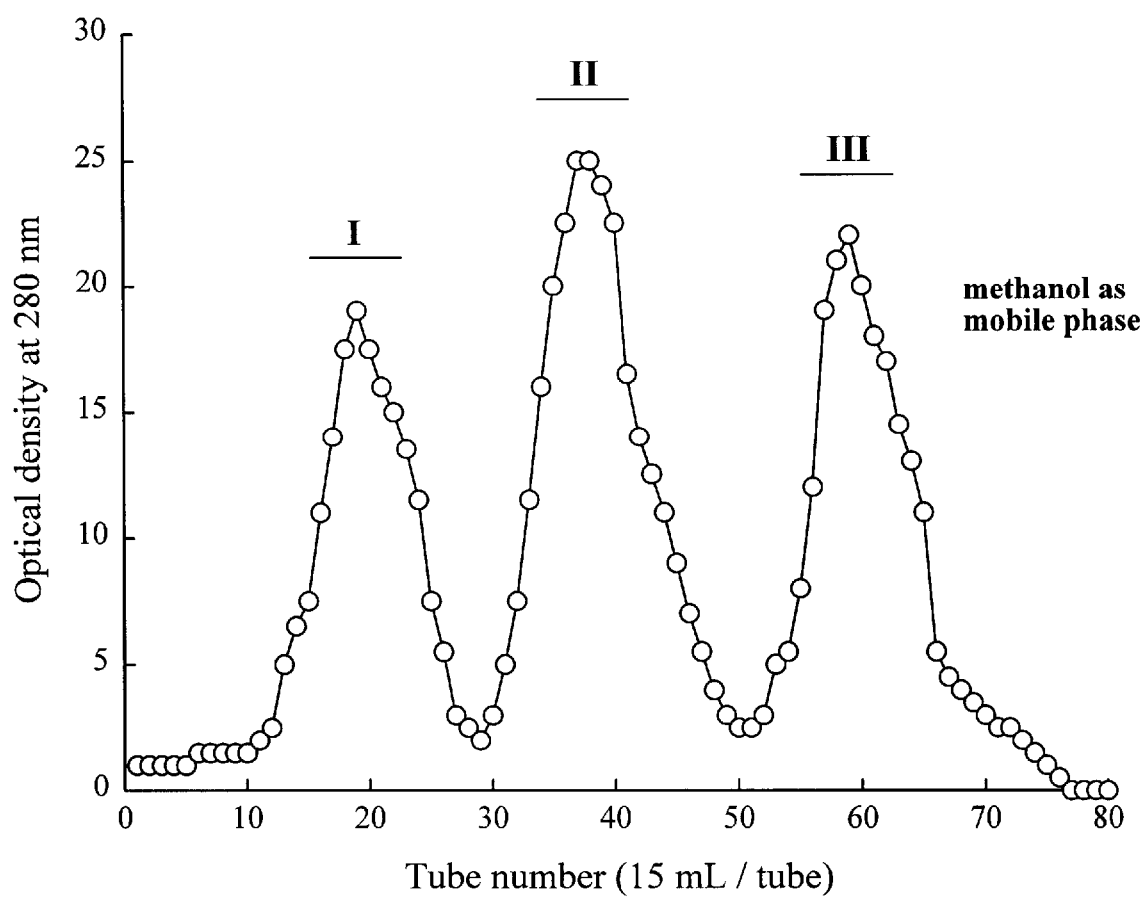
FIG. 5 is a graph illustrating the results for fractionation of the bearberry extract by column chromatography using methanol as the mobile phase.

An attempt to separate plant phenolics in the bearberry extract by Sephadex LH-20 chromatography resulted in 7 fractions, some of which possessed an antioxidative activity comparable to BHA in a β-carotene-linoleate model system. The results for the fractionation of the bearberry extract are summarized in Tables 1 and 2, and FIGS. 4 and 5.

TABLE 1

Bearberry Fractions Eluted from Sephadex LH-20 Column with Ethanol and Methanol[1]

| Fraction Number | Amount Recovered from Crude Extract (%) | Total Phenolics in each Fraction (mg/g) | Tannins in each Fraction (mg/g) |
| --- | --- | --- | --- |
| E-I | 21.4 | 60 | — |
| E-II | 55.9 | 280 | — |
| E-III | 2.5 | 274 | — |
| E-IV | 6.6 | 304 | — |
| M-I | 4.0 | 316 | 120 |
| M-II | 3.9 | 312 | 80 |
| M-III | 3.7 | 320 | 40 |

[1]Seven fractions were eluted from the column with 95% (v/v) ethanol (E-I, E-II, E-III, E-IV) followed by methanol (M-I, M-II, M-III).

TABLE 2

Antioxidative Activity of Bearberry Fractions in a β-Carotene-Linoleate Model System[2]

| Bearberry Fractions | Percent Inhibition after 60 min of Heating | Percent Inhibition after 120 min of Heating |
| --- | --- | --- |
| E-I | 99 | 95 |
| E-II | 84 | 75 |
| E-III | 100 | 100 |
| E-IV | 100 | 100 |
| M-I | 100 | 100 |
| M-II | 100 | 100 |
| M-III | 100 | 100 |

[2]Seven fractions were eluted from the column with 95% (v/v) ethanol (E-I, E-II, E-III, E-IV) followed by methanol (M-I, M-II, M-III) BHA's percent inhibition of lipid oxidation was 100% after both 60 minutes and 120 minutes of incubation.

Although fraction E-II accounted for the bulk of the bearberry extract (56%) and contained a substantial amount of phenolics (280 mg/g), its antioxidative efficacy was the lowest in the β-carotene-linoleate system, being 75% after 120 minutes of heating, as shown in Table 2. Fractions E-III, E-IV, M-I, M-II, and M-III all contained substantial amount of phenolics, and possessed an antioxidative activity comparable to that of BHA. The tannins in fractions M-I, M-II, and M-III accounted for 38%, 36%, and 12% of the total phenolics, respectively.

The bearberry extract was fractionated by Sephadex LH-20 column (bead size: 25 to 100 μm; Chromoflex column, 30×700 mm [I.D.×length], Kontes, Vineland, N.J., USA) chromatography. Samples were eluted from the column using first ethanol and then methanol as the mobile phase. A 2.0-g sample of bearberry extract was dissolved in 8 mL of methanol, applied to the top of the column bed and then equilibrated with ethanol. Fractions (15 mL) were collected using a LKB Bromma 2112 Redirac fraction collector (Pharmacia, Uppsala, Sweden) and their absorbance was measured at 280 nm. Eluates were then pooled into major fractions, solvent removed in vacuo using the rotavapor and product weighed. UV spectra were recorded for the various fractions using a spectrophotometer. The content of tannins in methanolic fractions was determined according to Price et al. (1978) and reported as (−)-epicatechin equivalents.

By column chromatography, the main compound from the bearberry extract was isolated on silica gel (particle size, 15 to 40 μ, average pore diameter: 60 Å; Chromaflex column, 30×250 mm [I.D.×length], Kontes). Compounds were eluted from the silica gel column using chloroform:methanol:water (65:35:10, v/v/v) as the mobile phase. Fractions (10 mL) were gathered using a fraction collector (Pharmacia) and their absorbance was measured at 280 nm. Eluates of the main compound were then pooled, solvent removed in vacuo using the rotavapor and product weighed. UV spectra were recorded for the various fractions using a spectrophotometer.

(f) Meat Model Test

The efficacy of the bearberry extract was tested in a meat model system. Pork cushions were obtained from Mitchell's Gourmet Foods, Ltd. (Saskatoon, SK). The meat was ground two times through a ⅛-inch plate using a Biro grinder/food mixer (AMFG Model 24, Marblehead, Ohio). Pork from the meat block was transferred to Mason jars and mixed with 20% (w/w) distilled water and various additives. Meat systems were thermal processed in an 85° C. thermostated water bath with occasional stirring by a glass rod until an internal temperature of 75±1° C. was reached. The meat systems were cooled to room temperature, homogenized in an Osterizer (Sunbeam Corporation [Canada] Ltd., Toronto, ON) blender for 30 seconds, transferred to Whirl Pak bags (Systems Plus, New Hamburg, ON) and refrigerated at 4° C. until used.

Thiobarbituric reactive substances (TBARS) were determined for the bearberry extract (Witte et al.,1970, and Bedinghaus and Ockerman, 1995). Briefly, a 5-g portion of each sample was transferred to a stomacher bag in which 50 mL of a 20% (w/v) TCA and 1.6% (v/v) phosphoric acid solution were added. Each sample was stomached (Stomacher Lab-Blender 400, Model BA6021, A. J. Seward, Co., Bury St. Edmunds, UK) for 2 minutes and then 50 mL of cold distilled water were added. After blending for an additional minute, each sample was filtered through Whatman #1 filter paper into a 100-mL volumetric flask. Each flask was filled to mark with distilled water/TCA solution (1:1 v/v) and its contents were mixed well. Five-mL aliquots from each sample were pipetted to polypropylene conical centrifuge tubes (VWR Canlab, Mississauga, ON) to which an equivalent volume of a 0.02 M aqueous TBA reagent was added. Tubes were capped and heated in a boiling water bath for 35 minutes, and then cooled in an ice bath. Absorbance measurements of the pink-colored chromogen were made at 532 nm against a reagent blank using a spectrophotometer. A 'k' factor of 20.1 was determined from a calibration curve based on addition of known quantities of the malonaldehyde precursor, 1,1,3,3-tetramethoxypropane, to cooked meat samples prior to extraction and an average recovery of 85.5% was found.

The TBARS values of cooked pork samples over a 2-week storage period treated with TBHQ or the bearberry extract at several concentrations are presented in Table 3.

TABLE 3

TBARS Values of Cooked Comminuted Pork as Affected by Synthetic and Natural Antioxidants

| | TBARS Values (mg malonaldehyde eq./kg sample) Days of Storage at 4° C. | | | | |
| --- | --- | --- | --- | --- | --- |
| Treatment[3] | 1 | 3 | 5 | 7 | 14 |
| No additives | 0.78 | 1.49 | 1.93 | 2.38 | 3.0 |
| Synthetic antioxidant, TBHQ, 50 ppm | 0.10 | 0.10 | 0.10 | 0.20 | 0.34 |
| Bearberry leaves extract, 100 ppm | 0.51 | 0.84 | 1.53 | 1.81 | 2.54 |
| Bearberry leaves extract, 200 ppm | 0.16 | 0.24 | 0.41 | 0.60 | 1.13 |
| Bearberry leaves extract, 500 ppm | 0.10 | 0.10 | 0.10 | 0.20 | 0.27 |

[3]All systems were prepared with comminuted fresh pork cushions + 20% (w/w) distilled water.

Although the antioxidative efficacy of the bearberry extract was noticeable even when employed at a 100-ppm addition level, it was quite effective at 200 ppm, yet its potency at inhibiting lipid oxidation when used at a concentration of 500 ppm was indistinguishable from that of the synthetic antioxidant. Use of bearberry extract at the 500-ppm addition level or at reduced levels in combination with a chelator system such as sodium tripolyphosphate and sodium ascorbate can protect meats against oxidation similarly to that observed from employment of a synthetic antioxidant such as TBHQ.

The TBARS values of cooked pork samples over a 2-week storage period treated with TBHQ, commercial natural antioxidants or the bearberry extract at several concentrations are presented in Table 4.

TABLE 4

TBARS Values of Cooked Comminuted Pork as Affected by Synthetic and Natural Antioxidants

| Treatment[4] | TBARS Values (mg malonaldehyde eq./kg sample) Days of Storage at 4° C. | | | | |
|---|---|---|---|---|---|
| | 1 | 3 | 5 | 7 | 14 |
| No additives | 0.83 | 1.33 | 1.52 | 1.97 | 3.13 |
| Synthetic antioxidant, TBHQ, 50 ppm | 0.10 | 0.10 | 0.10 | 0.23 | 0.45 |
| Duralox ®, Blend CAN-5, 1000 ppm | 0.30 | 0.88 | 1.15 | 1.81 | 3.11 |
| Duralox ®, Blend CAN-5, 2000 ppm | 0.19 | 0.32 | 0.56 | 0.94 | 1.86 |
| Guardian rosemary extract, 1000 ppm | 0.27 | 0.69 | 1.09 | 1.40 | 2.37 |
| Bearberry leaves extract, 200 ppm | 0.18 | 0.18 | 0.26 | 0.34 | 0.78 |
| Bearberry leaves extract, 200 ppm | 0.15 | 0.15 | 0.16 | 0.23 | 0.61 |
| Bearberry leaves extract, 500 ppm | 0.14 | 0.14 | 0.14 | 0.21 | 0.40 |

[4]All systems were prepared with comminuted fresh pork cushions + 20% (w/w) distilled water.

Based on the data presented above, it is evident that the bearberry extract was more effective at curbing oxidation in the cooked meat systems at a 200-ppm addition level than the commercial natural antioxidant preparations when used at concentrations of 1000 or 2000 ppm. Furthermore, even after refrigerated storage for 12 months, the bearberry extract showed a marked potency as compared to a fresh preparation thereby demonstrating that it has a suitable shelf life, which is necessary for commercial application.

(g) Taste Test

Preparation of Breakfast Pork Patties

Boneless pork shoulder picnics were received from Mitchell's Gourmet Foods Ltd. (Saskatoon, SK). These were ground through a ⅝-inch plate using the Biro mixer/grinder. The coarse ground meat was transferred to a mixer/tumbler (Model VSM-150, H. Glass, Paderbom, Germany). Ice, salt and spices were added (see Table 5 below).

TABLE 5

Formulations for Breakfast Pork Patties

| Ingredients† | Formulation No. 1 | | Formulation No. 2 | |
|---|---|---|---|---|
| Pork shoulder picnic | 95.37% | 16.21 kg | 95.5% | 16.24 kg |
| Water (as ice) | 3.0% | 510 g | 3.0% | 510 g |
| Salt | 1.2% | 204 g | 1.2% | 204 g |
| Black pepper | 0.3% | 51 g | 0.3% | 51 g |
| Sage | 0.1% | 17 g | — | — |
| Crushed chillies | 0.03% | 5 g | — | — |

†Spices were supplied by Unipac Packaging Products Ltd. (Edmonton, AB): Pepper black, 32 mesh (ED 20207); ground sage (ED 20305); and regular crushed chillies (ED 20101).

All ingredients were mixed for 3 minutes at full speed. The meat batter was transferred back to the Biro mixer/grinder and reground through a 3/16-inch plate. The meat block was portioned into 4 kg batches for 3 treatments (Treatment A—no additional additives; Treatment B—50 ppm TBHQ [synthetic antioxidant]; Treatment C—200 ppm bearberry extract). Each of the treated batches was then poured into a small mixer (Model ARM-20, Berkel Inc., La Porte, Ind.). Each batch was blended with a dough hook on low speed for 1 minute and then transferred to a patty machine (Hollymatic Super Model 54 Portioning Machine, Hollymatic Corp., Park Forest, Ill.). The meat batter was portioned into 4 oz (about 113 g) patties, and then stored at −1° C. for about 24 hours before cooking. Patties were grilled on a clam-shell grill (Model QS12-23, Taylor Co., Rockton, Ill) for 10 minutes at 160° C. and were flipped intermittently (an internal temperature >73° C. was reached). All patties were grilled on the first day of analysis, cooled and stored at 4° C. On subsequent days, the cooked breakfast patties were reheated for 1 minute in a microwave on high setting (Model ARM-20, Amana Refrigeration Inc., Amana, Iowa).

SENSORY ANALYSIS

A 14-member untrained panel (men and women, 7 of each) was used to evaluate the cooked pork samples by triangle tests over a 5-day period (i. e., 2 samples being the same and 1 different). On the first day of analysis, patties were grilled just before serving. Each grilled patty was portioned into 8 wedges and samples were presented to panellists in warmed ceramic serving dishes labelled with a random 3-digit code, along with unsalted crackers and water; standard white lighting was used. Panellists were asked to taste samples and to determine the "odd" one of the three, as well as to provide any general comments about the flavor.

TBA ANALYSIS

TBA reactive substances were determined in cooked pork patties over the course of the study as has been previously described.

RESULTS

Two different patty formulations were developed with moisture contents at about 65%, protein at about 16%, fat at about 17% and ash at about 2%. The first formulation is a typical preparation for a breakfast-type pork patty [e.g., JIMMY DEAN (™) sausage], while the second employs only a salt and black pepper mix. The second formulation was also used, in the event that the sage and chillies might mask a flavor note imparted by the bearberry extract. During the course of the study, none of the panellists reported a flavor defect (e.g., bitterness or astringency) in bearberry extract-treated samples of either formulation. In fact, panellists had great difficulty in determining the odd sample from the triangle tests; no statistical differences were found. The TBA results indicated that TBHQ and bearberry-treated samples retarded lipid oxidation during storage for both formulations.

PUBLICATIONS

AMAROWICZ, R. and SHAHIDI, F. 1995. Antioxidant activity of green tea catechins in a β-carotene-linoleate model system. J. Food Lipids 2, 47–56.

AMAROWICZ, R., KARAMAC, M., WANASUNDARA, J. P. D. and SHAHIDI, F. 1997. Antioxidant activity of hydrophobic phenolic fractions of flaxseed. Nahrung 41, 178–180.

AMAROWICZ, R., TROSZYNSKA, A., KARAMAC, M. and KOZLOWSKA, H. 1996a. Antioxidative properties of legume seed extracts. In: *Agri-Food Quality. An Interdisciplinary Approach*. G. R. Fenwick, C. Hedley, R. L. Richards and S. Khokhar (eds). Special Publication No. 179. The Royal Society of Chemistry, Cambridge, UK, pp. 376–379.

AMAROWICZ, R., WANASUNDARA, U. N., KARAMAC, M. and SHAHIDI, F. 1996b. Antioxidant activity of ethanolic extract of mustard seed. Nahrung 40, 261–263.

AMAROWICZ, R., KARAMAC, M., KMITA-GLAZEWSKA, H., TROSZYNSKA, A. and KOZLOWSKA, H. 1996c. Antioxidant activity of phenolic fractions of everlasting pea, faba bean and broad bean. J. Food Lipids 3, 199–211.

AMAROWICZ, R., PISKULA, M., HONKE, J., RUDNICKA, B., TROSZYNSKA, A. and KOZLOWSKA, H. 1995. Extraction of phenolic compounds from lentil seeds (Lens culinaris) with various solvents. Pol. J. Food Nutr. Sci. 4/45, 53–62.

AMAROWICZ, R., WANASUNDARA, U., WANASUNDARA, J. and SHAHIDI, F. 1993. Antioxidant activity of ethanolic extracts of flaxseed in a $\beta$-carotene-linoleate model system. J. Food Lipids 1, 111–117.

AMAROWICZ, R., KOZLOWSKA, H., SHIMOYAMADA, M. and OKUBO, K. 1992. Chromatographic analysis of rapeseed glucoside fractions. Pol. J. Food Nutr. Sci. 1/42, 89–93.

BARTON, G. M., EVANS, R. S. and GARDNER, J. A. F. 1952. Paper chromatography of phenolic substances. Nature 170, 249–250.

BEDINGHAUS, A. J. and OCKERMAN, H. W. 1995. Antioxidative Maillard reaction products from reducing sugars and free amino acids in cooked ground pork patties. J. Food Sci. 60, 992–995.

CHAVAN, U. D., AMAROWICZ, R. and SHAHIDI, F. 1999. Antioxidant activity of phenolic fractions of beach pea (Lathyrus maritimus L.). J. Food Lipids 6, 1–11.

CHEN, Q., HUANG, S. and HO, C-T. 1992. Effects of rosemary extracts and major constituents on lipid oxidation and soybean lipoxygenase activity. J. Am. Oil Chem. Soc. 69, 999–1002.

DZIEZAK, J. D. 1986. Preservatives: Antioxidants. The ultimate answer to oxidation. Food Technol. 40(9), 94–97, 100–102.

HATANO, T., KAGAWA, H., YASUHARA, T. and OKUDA, T. 1988. Two new flavonoids and other constituents in licorice root: Their relative astringency and radical scavenging effects. Chem. Pharm. Bull. 36, 2090–2097.

MILLER, H. E. 1971. A simplified method for the evaluation of antioxidants. J. Am. Oil Chem. Soc. 48,91.

NACZK, M. and SHAHIDI, F. 1989. The effect of methanol-ammonia-water treatment on the content of phenolic acids of canola. Food Chem. 31, 159–164.

NAKATANI, N. 1997. Antioxidants from Spices and Herbs. In Natural Antioxidants: Chemistry, Health Effects, and Applications, (F. Shahidi, ed.) pp. 64–75, AOCS Press, Champaign, Ill.

NAMIKI, M. 1990. Antioxidants/antimutagens in food. CRC Crit. Rev. Food Sci. Nutr. 29,273–300.

OYAIZU, M. 1986. Studies on products of browning reaction: Antioxidative activities of products of browning reaction prepared from glucosamine. Jpn. J. Nutr. 44, 307–315.

PRICE, M. L., VAN SCOYOC, S. and BUTLER, L. G. 1978. A critical evaluation of the vanillin reaction as an assay for tannin in sorghum grain. J. Agric. Food Chem. 26, 1214–1218.

SHAHIDI, F., WANASUNDARA, U. N. and AMAROWICZ, R. 1994. Natural antioxidants from low-pungency mustard flour. Food Res. Int. 27, 489–493.

SWAIN, T. and HILLIS, W. E. 1959. The phenolic constituents of Prunus domestica. I.-The quantitative analysis of phenolic constituents. J. Sci. Food Agric. 10, 63–68.

WANASUNDARA, U. N., AMAROWICZ, R. and SHAHIDI, F. 1996. Partial characterization of natural antioxidants in canola meal. Food Res. Int. 28, 525–530.

WANASUNDARA, U., AMAROWICZ, R. and SHAHIDI, F. 1994. Isolation and identification of an antioxidative component in canola meal. J. Agric. Food Chem. 42, 1285–1290.

WITTE, V. C., KRAUSE, G. F. and BAILEY, M. E. 1970. A new extraction method for determining 2-thiobarbituric acid values of pork and beef during storage. J. Food Sci. 35, 582–585.

WONG, J. W., HASHIMOTO, K. and SHIBAMOTO, T. 1995. Antioxidant activities of rosemary and sage extracts and vitamin E in a model meat system. J. Agric. Food Chem. 43, 2707–2712.

YEN, G-C. and CHEN, H-Y. 1995. Antioxidant activity of various tea extracts in relation to their antimutagenicity. J. Agric. Food Chem. 43, 27–32.

ZEGARSKA, Z., RAFALOWSKI, R., AMAROWICZ, R., KARAMAC, M. and SHAHIDI, F. 1998. Stabilization of butter with deodorized rosemary extract. Z. Lebensm. Unters. Forsch. A 206, 99–102.

What is claimed is:

1. A process for producing a plant extract for use as an antioxidant, comprising the steps of:
   extacting an intermediate extract from plant tissue obtained from the bearberry plant (Arctostaphylos uva-ursi) with a solvent containing at least approximately 95% ethanol by volume;
   loading the intermediate extract on a chromatographic column, comprising silicic acid; and
   eluting chlorophyll from the column with a mobile phase comprising hexane.

2. The process of claim 1, wherein the step of extracting the intermediate extract comprises the steps of:
   grinding the plant tissue;
   mixing the ground plant tissue with the solvent to form a slurry;
   filtering the slurry and collecting the supernatant; and
   evaporating the ethanol from the supernatant.

3. The process of claim 2, wherein the step of extracting the intermediate extract further comprises the steps of:
   heating the slurry; and
   shaking the slurry.

4. The process of claim 1, further comprising the step of eluting an ethanol fraction from the column with a mobile phase comprising ethanol.

5. The process of claim 4, further comprising the step of evaporating the ethanol from the ethanol fraction.

6. The process of claim 5, wherein the step of evaporating the ethanol from ethanol Fraction comprises the step of heating the ethanol fraction.

7. The process of claim 5, wherein the step of evaporating the ethanol from the ethanol fraction comprises the step of subjecting the ethanol fraction to a pressure which is less than the ambient atmospheric pressure.

8. The process of claim 5, wherein the step of evaporating the ethanol from the ethanol fraction comprises the steps of concurrently subjecting the ethanol fraction to a pressure which is less than the ambient atmospheric pressure and heating the ethanol fraction.

* * * * *